(No Model.)
R. H. TWEDDELL, J. PLATT & J. FIELDING.
RIVETING MACHINE.
No. 310,547. Patented Jan. 6, 1885.
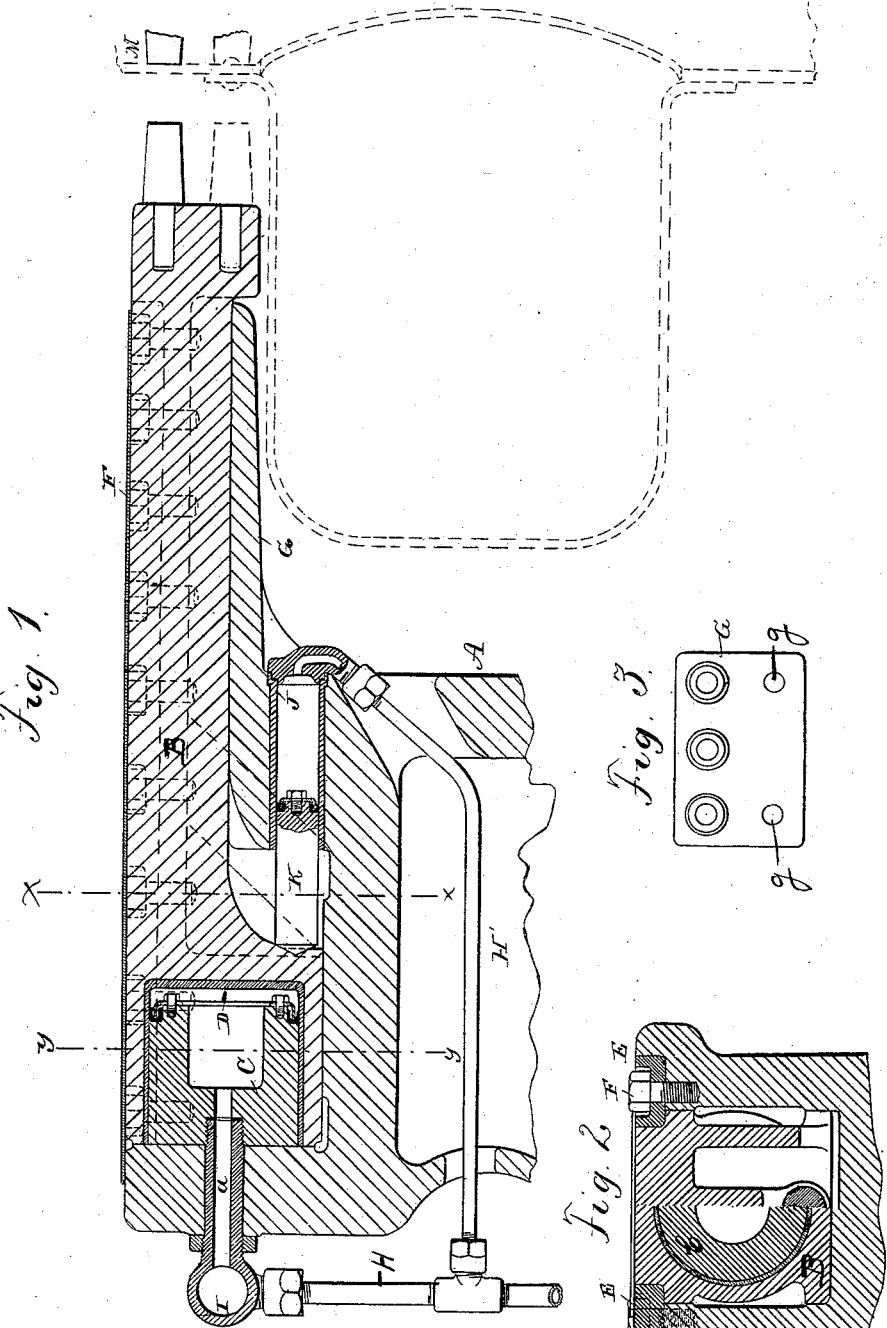

UNITED STATES PATENT OFFICE.

RALPH HART TWEDDELL, OF WESTMINSTER, COUNTY OF MIDDLESEX, AND JAMES PLATT AND JOHN FIELDING, OF GLOUCESTER, COUNTY OF GLOUCESTER, ENGLAND.

RIVETING-MACHINE.

SPECIFICATION forming part of Letters Patent No. 310,547, dated January 6, 1885.

Application filed May 14, 1884. (No model.)

*To all whom it may concern:*

Be it known that we, RALPH HART TWEDDELL, of Westminster, in the county of Middlesex, and JAMES PLATT and JOHN FIELDING, of Gloucester, in the county of Gloucester and Kingdom of Great Britain, have invented certain new and useful Improvements in Hydraulic Riveters; and we do hereby declare the following to be a full, clear, and exact description of the invention, such as will enable others skilled in the art to which it appertains to make and use the same.

Our invention relates to an improvement in hydraulic riveters, adapted more particularly for riveting domes on boilers; and it consists in certain features of construction, as will be more fully described, and pointed out in the claims.

In the accompanying drawings, Figure 1 is a view in vertical longitudinal section of a riveter embodying our invention. Fig. 2 is a transverse sectional view of the same, taken on the lines $y\ y$ and $x\ x$ of Fig. 1, the section on $y\ y$ being shown on the left hand of the figure, and the section $x\ x$ on the right-hand side; and Fig. 3 is an end view of the plunger.

A represents the base of a machine, provided with a recess or gutter in which the movable plunger B rests and moves. This recess is open at one end and closed at the other, the said closed end being provided with a small opening, $a$, through which the water under pressure enters.

Rigidly secured to the closed end of the frame A is the piston C, which latter is cylindrical in form, and provided at its forward end with an open chamber, which latter is in direct communication with the chambered end of the plunger. This plunger B can be of any suitable shape, and is preferably enlarged at its rear end, the said enlarged end being hollowed out to form a cylinder, D, in which the piston C rests. The plunger B is adapted to move longitudinally in the recessed upper end of the frame, and is held against displacement by the hardened metallic bars E, which latter are secured to the frame A by the bolts F, and overlap the opposite side edges of the plunger. This plunger is considerably elongated, to enable it to overreach the longest dome, and is supported throughout nearly its entire length by the forwardly-projecting portion G of the frame A.

H is the supply-pipe, one end of which is in communication with an accumulator, while the opposite end thereof is connected to the valve-casing I. By means of the valve (not shown) inclosed in said casing the water is admitted and discharged from the cylinder.

H' is a branch pipe, one end of which is connected to the pipe H, while the opposite end thereof is in open communication with the push-back cylinder J, secured within the frame A, and considerably smaller than the cylinder D. Within this cylinder is fitted the push-back plunger K, one end of which bears against the plunger B and exerts sufficient pressure thereagainst to push the plunger back to a closed position, when the pressure-supply to the main cylinder is cut off and the discharge opened. The outer or free end of the plunger B is provided with a series of holes, preferably five, to enable the riveting-tool to be adjusted so as to head up the rivets in the various positions around the dome. This perforated or socketed end of the plunger is preferably rectangular, as shown in Fig. 3, and provided with three sockets, $g$, arranged in the same plane near the upper edge of the plunger, and two sockets arranged in the same plane, preferably under the two end sockets of the upper row. Only one riveting-tool is employed at a time, and for the sake of illustrating the operation we will describe the manner of riveting on a dome, commencing at the left-hand side of the dome at the center, and riveting to the right over the dome. At the commencement of the operation the boiler, with the dome temporarily secured thereto, is elevated to the desired position and the riveting-tool inserted in the lower socket nearest the dome. As the rivets are headed the boiler is lowered to bring the next hole between the riveting-tools, and so on until the dome has been riveted one-quarter around. When this point is reached, the dome rests directly under the plunger, as shown in Fig. 1, and the riveting-tool is then removed from the lower right-hand socket (looking toward the boiler) and placed in the lower left-hand socket. The boiler is then gradually elevated as the riveting progresses until another quarter of the dome has been completed, when the riveting-tool is taken from the lower left-hand socket and placed in the upper left-hand socket. The boiler is then gradually elevated, as before, until another quarter has been completed, when the riveting-tool is removed and placed in the upper right-hand socket. The boiler is now gradually lowered until all the complete dome-flange has been riveted to the boiler. During this process the dome is moved once around the plunger, during which movement the dome is riveted to the boiler. If desired, the plunger can have one or more sockets, situated between the end sockets, into which the riveting-tool can be inserted when performing ordinary work. A die-holder on the part M is provided with similar sockets into which the riveting-tool is inserted.

We are aware that it is not broadly new in a riveting-machine to provide the plunger with a series of sockets for the reception of a removable-riveting-tool; also, that it is not new to secure the plunger in position in the machine-frame by means of a removable cap; and, also, that a small secondary plunger has been heretofore employed for forcing the riveting-plunger back into its cylinder after it has completed its outstroke, and hence we do not claim the same broadly; but, Having fully described our invention, what we claim as new, and desire to secure by Letters Patent, is—

1. In a riveting-machine, the combination, with the supporting-base provided with a projecting plunger-support, of a plunger having a cylinder formed in its rear end, a stationary piston fitting within said cylinder, and a push-back plunger arranged to engage the main plunger, substantially as set forth.

2. The combination, with a frame having a groove or gutter therein and a stationary piston secured to said frame inside of the groove, of the plunger having a cylindrical cavity or cylinder formed in the rear thereof, a smaller cylinder, and a push-back plunger working in said latter cylinder and bearing against the larger plunger.

In testimony whereof we have signed this specification in the presence of subscribing witnesses.

RALPH HART TWEDDELL.
JAMES PLATT.
JOHN FIELDING.

Witnesses to the signature of Ralph Hart Tweddell:
H. G. SCOTT,
WM. BAILEY.

Witnesses to the signatures of James Platt and John Fielding:
JOHN A. POPE,
A. CADENNE.